Feb. 2, 1954
L. D. WEBSTER
2,667,793
DUMP BOX CONTROL LEVER
Filed Feb. 19, 1951
2 Sheets-Sheet 1
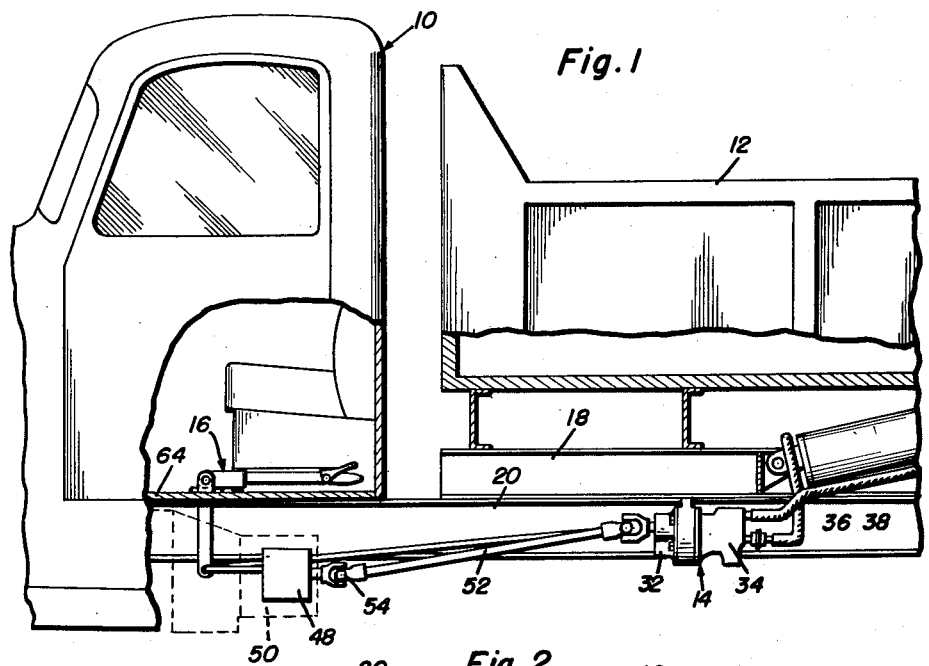
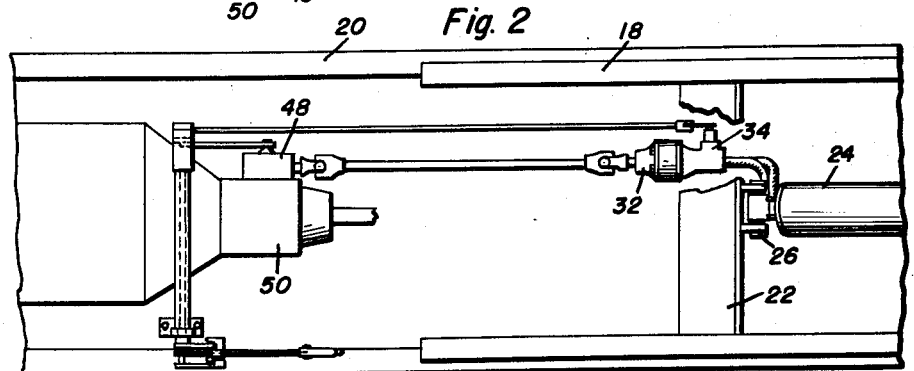
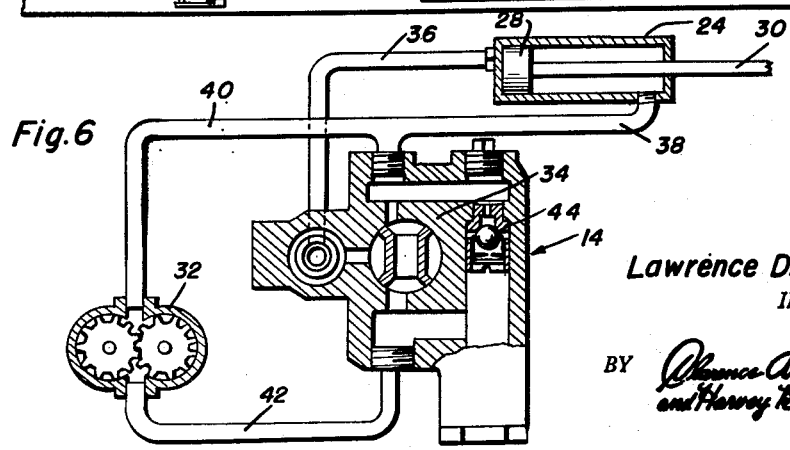
Lawrence D. Webster
INVENTOR.
BY
Attorneys Feb. 2, 1954    L. D. WEBSTER    2,667,793
DUMP BOX CONTROL LEVER
Filed Feb. 19, 1951    2 Sheets-Sheet 2
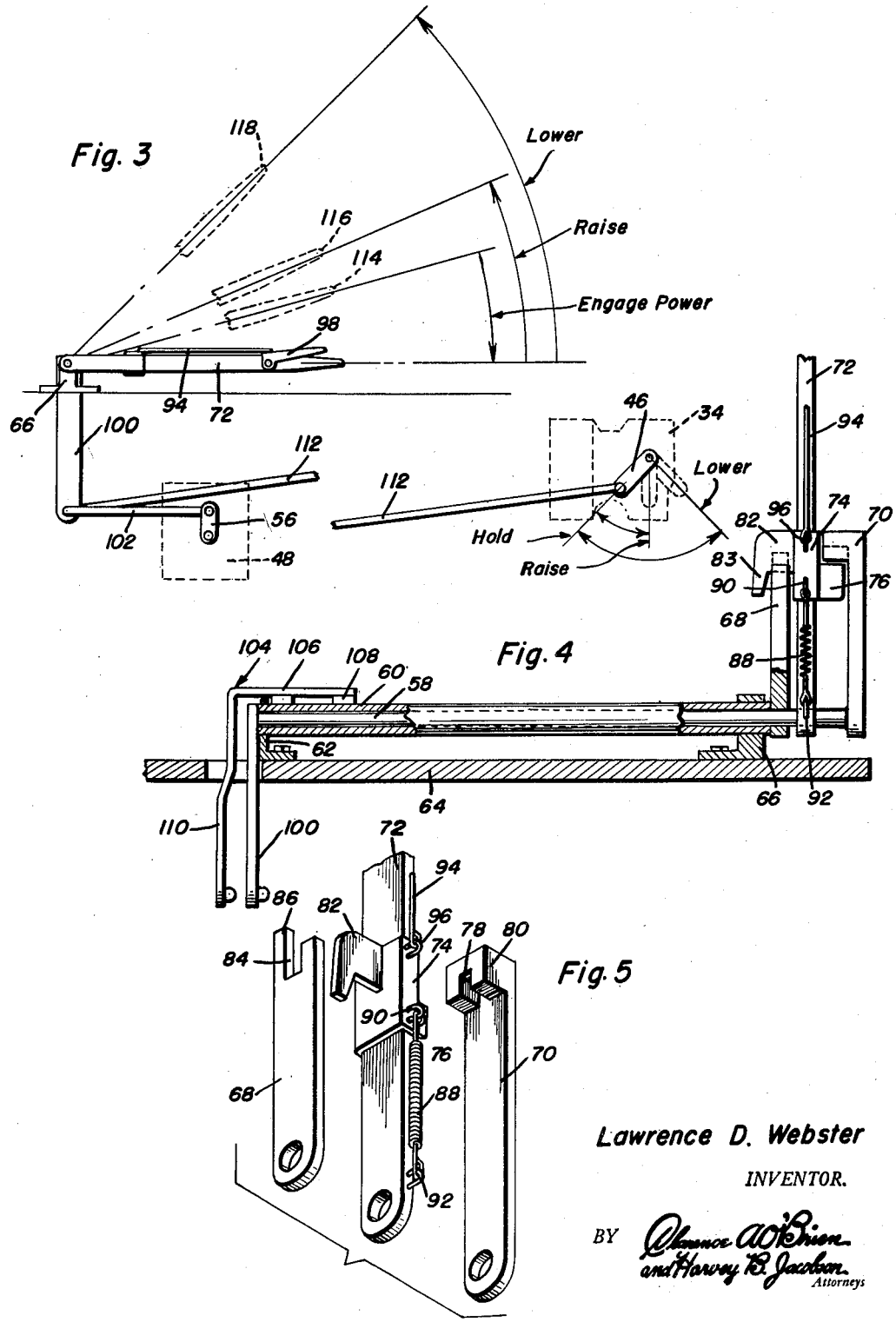
Lawrence D. Webster
INVENTOR.

Patented Feb. 2, 1954

2,667,793

UNITED STATES PATENT OFFICE 2,667,793

DUMP BOX CONTROL LEVER

Lawrence D. Webster, Livonia, N. Y.

Application February 19, 1951, Serial No. 211,733

2 Claims. (Cl. 74—471)

This invention is comprised of novel and useful improvements in control levers, and more particularly pertains to a lever for controlling the operation of a hydraulic dump box raising mechanism.

When utilizing the dump box of a truck to spread aggregate over an oiled surface, in the construction of roads or the like, it is necessary that the dump box of the truck be gradually raised as the truck is backed over the surface to be covered. At present, it is customary to position the dump box control levers near the center portion of the truck cab, which construction precludes the truck operator from simultaneously watching where he is backing, while he manipulates the dump box control levers to maintain the box at the proper elevation. It is accordingly an important object of this invention to provide a lever assembly which may be mounted on conventional trucks to enable the dump box to be controlled from the side of the truck cab so that it may be more easily manipulated by the driver while operating the truck, or when standing alongside the truck and assisting in the loading of machinery; which assembly, by virtue of its placement on the side of the truck cab, increases the usable floor space in the cab; and which assembly will not necessitate any material alterations in the conventional construction of the trucks or the dump box lifting mechanism.

Another important object of this invention is to provide a dump box control lever assembly, in accordance with the foregoing object, in which a single lever is manipulable to control the power take-off to the pump, and to also control the hydraulic valve which regulates the flow of fuel from the pump to the hoist cylinder.

A further object of this invention is to provide a lever control assembly, constructed in accordance with the foregoing objects, in which the single lever is so constructed and arranged relative to the power take-off control arm and the valve control arm, that the valve will be moved into a position to recirculate the fluid in the pump whenever the power take-off lever is moved into its power engaging position, so that the pump will be under substantially no load whenever it is being drivingly connected to a source of power.

An important feature of this invention resides in the provision of inner and outer concentric shafts, control arms carried by one end of each shaft and movable in relatively parallel planes, with a control lever rotatably mounted on one shaft between the control arms, and with a mechanism carried by the control lever for selectively locking either of the control arms to the control lever for movement therewith.

Another important feature of this invention resides in the provision of a control lever assembly, constructed in accordance with the foregoing feature, with a journal rotatably supporting the end of the outer shaft remote from the end thereof which has the control arm attached thereto, with an actuating arm attached to the inner shaft in abutting engagement with the journal and the adjacent end of the outer shaft, whereby the control arms on the remote ends of the shafts are maintained in a predetermined spaced relation.

Yet a further feature of this invention resides in the provision of a control lever assembly, in accordance with the foregoing features, in which the lock mechanism on the control lever includes a member slidable longitudinally of the lever and having ears projecting laterally from opposite sides thereof, which ears are movable with the member to engage corresponding lugs on either of the control arms to lock either of the arms to the lever, from movement therewith, together with a projection on one of the lugs which is so constructed as to cause the arm to which it is attached to move in one direction with the control lever whenever the latter is locked to the other of the control arms.

These, together with various ancillary objects and features are attained by this device, a preferred embodiment of which has been illustrated in the accompanying drawings, wherein:

Figure 1 is a fragmentary side elevational view of a dump truck, parts being broken away and shown in section to illustrate the construction of the hoist mechanism;

Figure 2 is a fragmentary plan view of the dump truck, with the cab and dump box removed therefrom;

Figure 3 is a diagrammatic showing of the control lever assembly shown operatively connected to the power take-off to the pump and to the hydraulic valve which controls the flow of fluid from the pump;

Figure 4 is a fragmentary transverse sectional view of the dump truck having the control lever assembly mounted thereon, parts of the assembly being broken away and shown in section to illustrate details of construction;

Figure 5 is a fragmentary perspective assembly view of the control lever and the control arms, together with the mechanism for selectively locking the lever to either of the control arms; and Figure 6 is a diagrammatic showing of the hydraulic system of the dump box hoist.

Reference is now made more specifically to the accompanying drawings wherein the truck 10 having a dump box 12 mounted thereon, is illustrated, which dump box is selectively raised by a hydraulic lift assembly, indicated generally by the numeral 14, and which lift assembly is controlled by the lever assembly 16.

As is conventional, the truck 10 includes a pair of laterally spaced rails 18 which are supported by the frame members 20, which rails are connected by suitable cross beams 22. A hydraulic cylinder 24 is vertically pivotally attached, as at 26, to one of the transverse beams 22, which cylinder has a piston 28 movably mounted therein, and operatively connected by a rod 30 to a dump box 12. The dump box lifting assembly includes a fluid pump 32 which is connected to a control valve 34 and by conduits 36 and 38 to the forward and rear ends, respectively, of the hydraulic cylinder 24. As diagrammatically shown in Figure 6, the pump 32 is connected to the valve 34, by conduits 40 and 42 which respectively communicate with the inlet and outlet ports of the pumps, but in actual construction, the pump and valve are formed in the same housing, as is shown in Figures 1 and 2. The valve 34, in the position shown in Figure 6, communicates the conduits 40 and 42 with each other, and consequently fluid is merely recirculated in the pump, the valve when in that position, further serving to close communication between the conduit 36, and the rest of the system whereby the piston 28 will be prevented from moving toward the left, as the piston 28 will be maintained in its predetermined adjusted position, when the valve is in the position shown in Figure 6, this position is termed the "hold" position of the valve member. The valve member is also rotatable in a counter-clockwise direction, as viewed in Figure 6, into its "raise" position, at which time the conduit 42 is communicated with the conduit 36, the valve being movable into a third position, substantially one-quarter turn counter-clockwise, as viewed in Figure 6, at which time the conduit 36 is communicated with the conduit 40, to permit the piston to move toward the left. When the valve 34 is in its last mentioned "lower" position, the discharge from the pump 32 passes through the conduit 42, and through the pressure relief valve 44, back through the conduit 40, to the pump. A lever 46 is operatively connected to the valve 34, for movement about the same axis as that about which the valve rotates, which lever is movable, as indicated by the legend in Figure 3, from its "hold" position into an intermediate "raise" position or into its extreme "lower" position.

A power take-off assembly 48, which is carried by the side of the transmission 50 is connected by a drive shaft 52, and flexible couplings 54, to the pump 32. A lever 56 is operatively connected to the power take-off 48, so as to selectively connect and disconnect the power take-off from the vehicle transmission 50. With the lever 56, in the position shown in Figure 3, the power take-off is drivingly engaged with the transmission, and when the lever 56 is pivoted in a clockwise direction, as viewed in Figure 3, the power take-off is operatively disconnected from the transmission.

The lever assembly 16 which is provided to control the power take-off 48 and the valve 34, includes inner and outer concentric shafts 58 and 60 respectively, the outer shaft 58 being rotatably supported by first and second journals 62 and 66 carried by the floor board 64 of the truck 10. A valve control arm 68 is non-rotatably attached to the end of the outer shaft 60 adjacent the journal 66 and a power take-off control arm 70 is non-rotatably attached to the inner shaft 58, and is disposed in parallel spaced relation to the valve control arm. A control lever 72 is pivotally attached to the inner shaft 58, between the control arms 68 and 70, and has a guide block 74 longitudinally slidably mounted thereon. An ear 76 projects laterally of one side of the block 74, adjacent one end thereof and is movable so as to be selectively receivable in the recess 78 in the lug 80 carried by the power take-off control arm 70. A lip 82 projects laterally from the opposite of the guide block 74, adjacent the end thereof remote from that from which the ear 76 projects, which ear is movable into and out of the recess 84 in the end of the valve control arm 68 and a guide finger 83 is carried by the ear for guiding engagement with the control arm 68. As will be appreciated, movement of the block 74 in a direction away from the shafts 58 and 60 will cause the ear 76 to move into the recess 78 in the lug 80, to thereby lock the power take-off control arm 70 to the lever 72, for movement with the latter. Movement of the block 74, in the opposite direction, will cause the lip 82 to move into the recess 84 in the valve control lever 68, to lock the latter arm to the lever 72. It is contemplated that when one of the arms is locked to the control lever, that the other arm be operatively disengaged therefrom. However, for reasons which will later become apparent as the following description proceeds, the valve control arm 68 is provided with a projection 86 which underlies the lip 82, even when the block 74 is moved so as to lock the power take-off control arm to the lever 72. Thus, whenever the control lever 72 is moved downward, or in a clockwise direction as viewed in Figures 1 and 3, the valve control arm 68 will be moved downward when the control lever 72 is locked to the power take-off arm 70, but the valve control arm 68 is nevertheless movable with the lever 72 independent of the power take-off control arm 70. A spring 88 is terminally attached to the block 74, as at 90 and to the lever 72, as at 92, so as to yieldingly urge the lip 82 into the recess 84 in the valve control arm 68. A rod 94 is attached to the block 74, as at 96, and otherwise attached to the pivotally mounted finger 98, which is carried by the lever 72, which finger is movable to urge the block in a direction to cause the ear 76 to lockingly engage the power take-off control arm 70.

A power take-off actuating arm 100 is secured to the end of the inner shaft 58, remote from the end to which the control arm 70 is attached, which actuating arm abuts the first journal 62 and the adjacent end of the outer shaft to thereby limit movement of the control arms 68 and 70, away from each other. The arm 100 is connected by a link 102 to the lever 56, as is best shown in Figure 3, whereby vertical pivotal movement of the control lever 72, with the finger 98 released, will cause the power take-off to be engaged and disengaged.

An L-shaped valve actuating member 104 has one leg 106 secured to the reinforcing bars 108 which are carried by the outer shaft, the other leg 110 extending transversely of the outer shaft, and movable therewith in an arc which parallels the path of movement of the actuating arm 100. The valve actuating member or arm 104 is connected by a link 112 to the valve control lever 46, whereby the valve is also selectively moved into its "hold," "raise," or "lower" positions, in response to vertical pivotal movement of the control lever 72.

In operating the lever assembly 16, the control lever 72 is first elevated into the dotted line position shown at 114, in Figure 3, with the finger 96 depressed so as to move the lip 82 out of the recess 84 in the valve control arm 68. The power take-off control arm 70, which is positioned at an angle to the horizontal when in its disengaged position, is then engaged by the ear 76 which is receivable in the recess 78 in the lug 80, and the lever 72 then depressed into the horizontal position shown in Figure 3, to engage the power take-off, and establish driving connection between the pump 22 and the transmission 50. The lever 72 is then raised, with the finger 96 released, so that the lip 82 lockingly engages the valve control arm 68, and the lever and valve control arm then move to the "raise" position indicated at 116, in Figure 3. As indicated by the legend in Figure 3, further raising of the lever 72 to the position shown at 118, which is the "lower" position of the lever will cause the valve lever 46 to rotate the valve 34 into a position in which the conduits 36 and 40 are communicated with each other, and the discharge of the pump 42 bypassed through the valve 44.

As it is obviously undesirable to have the power take-off moved into driving engagement when the valve is positioned so as to place a load upon the pump, there has been provided a projection 86 on the valve control arm, which moves the latter into its "hold" position whenever the control lever 72 is moved downward, to move the power take-off lever into its "engage power" position.

From the foregoing it will be appreciated that there has been provided a single control lever 72 which is manipulable to control both the power take-off and the valve of the hydraulic hoist, and which lever is so constructed as to prevent engaging of the power take-off when the valve is in a position to cause the pump to do work, when the latter is driven. As it is believed that the operation and construction of the device will be readily understood from the foregoing, further description is believed to be unnecessary. However, since numerous modifications will readily occur to those skilled in the art after a consideration of the foregoing specification and accompanying drawing, it is not intended to limit the invention to that shown and described, but all suitable modifications may be resorted to, falling within the scope of the appended claims.

Having described the invention, what is claimed as new is:

1. A control for a power lift dump box comprising inner and outer concentric shafts, first and second journals rotatably supporting the ends of said outer shaft, a control arm non-rotatably attached to each of said inner and outer shafts adjacent the ends thereof remote from said first journal, a control lever rotatably mounted on one of said shafts for movement in opposite directions respectively, means on said control lever for selectively locking said lever to either of said control arms in one direction only of movement of said lever and with both of said control arms in the other direction only of movement of said lever, and actuating arms attached to the ends of said shafts adjacent said first journal and adapted to control a valve and a pump associated with the power lift of the dump box.

2. The combination of claim 1 wherein said means for locking said lever to either of said control arms includes a member longitudinally slidably mounted on said lever for manual movement upwardly and downwardly respectively, ears projecting laterally from opposite sides of said member, and spring means connected to said lever and member urging said member downwardly, said control arms each having a recess therein into one of which one of said ears is moved by downward movement of said member and into the other of which the other ear is moved by upward movement of said member.

LAWRENCE D. WEBSTER.

References Cited in the file of this patent

UNITED STATES PATENTS

| Number | Name | Date |
|---|---|---|
| 804,971 | Packard | Nov. 21, 1905 |
| 1,135,737 | Stevens | Apr. 13, 1915 |
| 1,160,259 | Cassidy | Nov. 16, 1915 |
| 1,269,581 | Daimler | June 18, 1918 |
| 1,401,093 | McDaniels | Dec. 20, 1921 |
| 1,635,953 | Roth | July 12, 1927 |
| 2,292,091 | Rhodes | Aug. 4, 1942 |
| 2,369,694 | Trippensee | Feb. 20, 1945 |
| 2,408,098 | Schon | Sept. 24, 1946 |
| 2,419,908 | Mott | Apr. 29, 1947 |
| 2,501,661 | Christensen | Mar. 28, 1950 |